United States Patent
Cappiello et al.

(10) Patent No.: US 8,296,287 B1
(45) Date of Patent: Oct. 23, 2012

(54) DYNAMIC SOURCING

(75) Inventors: Scott Cappiello, San Marcos, CA (US);
Xun Feng, Great Falls, VA (US);
Yuliyan Kiryakov, Arlington, VA (US);
Jun Yuan, Great Falls, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 12/907,494

(22) Filed: Oct. 19, 2010

Related U.S. Application Data

(60) Provisional application No. 61/252,810, filed on Oct. 19, 2009.

(51) Int. Cl.
*G06F 17/30* (2006.01)
(52) U.S. Cl. .......................................... 707/713
(58) Field of Classification Search .............. 707/4, 101, 707/713; 709/223
See application file for complete search history.

(56) References Cited

U.S. PATENT DOCUMENTS

2008/0114793 A1* 5/2008 Grosset et al. ................ 707/101
2009/0287666 A1* 11/2009 DeKimpe et al. ................ 707/4

* cited by examiner

*Primary Examiner* — Etienne Leroux
(74) *Attorney, Agent, or Firm* — Fish & Richardson P.C.

(57) ABSTRACT

Dynamic sourcing, in which a data request that is associated with a query is received and a parameter of data needed for satisfaction of the query is identified. Parameter information defining data available in at least one cube stored in a cache is accessed and the parameter is compared with the parameter information. Based on comparison results, it is determined whether one or more cubes in the cache include sufficient data to satisfy the query. In response to a determination that one or more cubes include sufficient data to satisfy the query, a response to the data request is generated by executing the query against the one or more cubes. In response to a determination that the cubes do not include sufficient data to satisfy the query, a response to the data request is generated by executing at least a portion of the query against a database system.

21 Claims, 13 Drawing Sheets

DYNAMIC SOURCING

CROSS REFERENCE TO RELATED APPLICATIONS

The present application claims priority to U.S. Provisional Application No. 61/252,810, filed Oct. 19, 2009, which is incorporated herein by reference in its entirety for all purposes.

FIELD

The present disclosure generally relates to database technology.

BACKGROUND

Computer systems are used to manage and store data. As such, they may be used to analyze data and generate reports based on the analysis results. For instance, computer systems may filter data and calculate metric values based on the filtered data, ultimately providing a report including the calculated metric values.

SUMMARY

In one aspect, this disclosure relates to dynamic sourcing technology.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers represent corresponding parts throughout.

DETAILED DESCRIPTION

In some implementations, a database system enables application designers to build intelligent cubes, which may be pre-aggregated, pre-calculated caches of data that exist in an application server (e.g., intelligence server) in the database system. When the database system receives a request to create a new report, the database system evaluates the report definition and determines whether the report can be resolved by accessing one or more intelligent cubes, instead of accessing the underlying database. When the report can be resolved by accessing one or more intelligent cubes, the report may execute more quickly because the database system accesses pre-processed data to generate the report.

In some examples, the database system performs a dynamic selection of whether to use the pre-processed data found in the cubes and which one or more cubes to use. The dynamic selection is transparent to the report designer and the report designer does not need to know that cubes exist or know which cube will be used to resolve the report request. In addition, the database system is able to further process the pre-processed data found in the cubes. In this regard, the database system allows report requests to be retrieved from a cube that is not an exact match. For instance, the database system may perform additional filtering, aggregation, and calculations to obtain the final result from the cubes without having to access the underlying database.

In addition, the database system may leverage one or more cubes to resolve part of a report request and the underlying database to resolve another part of the report request. For instance, the database system may obtain metric one from cube one, metric two from cube two, and metric three from the database.

Figure 1:
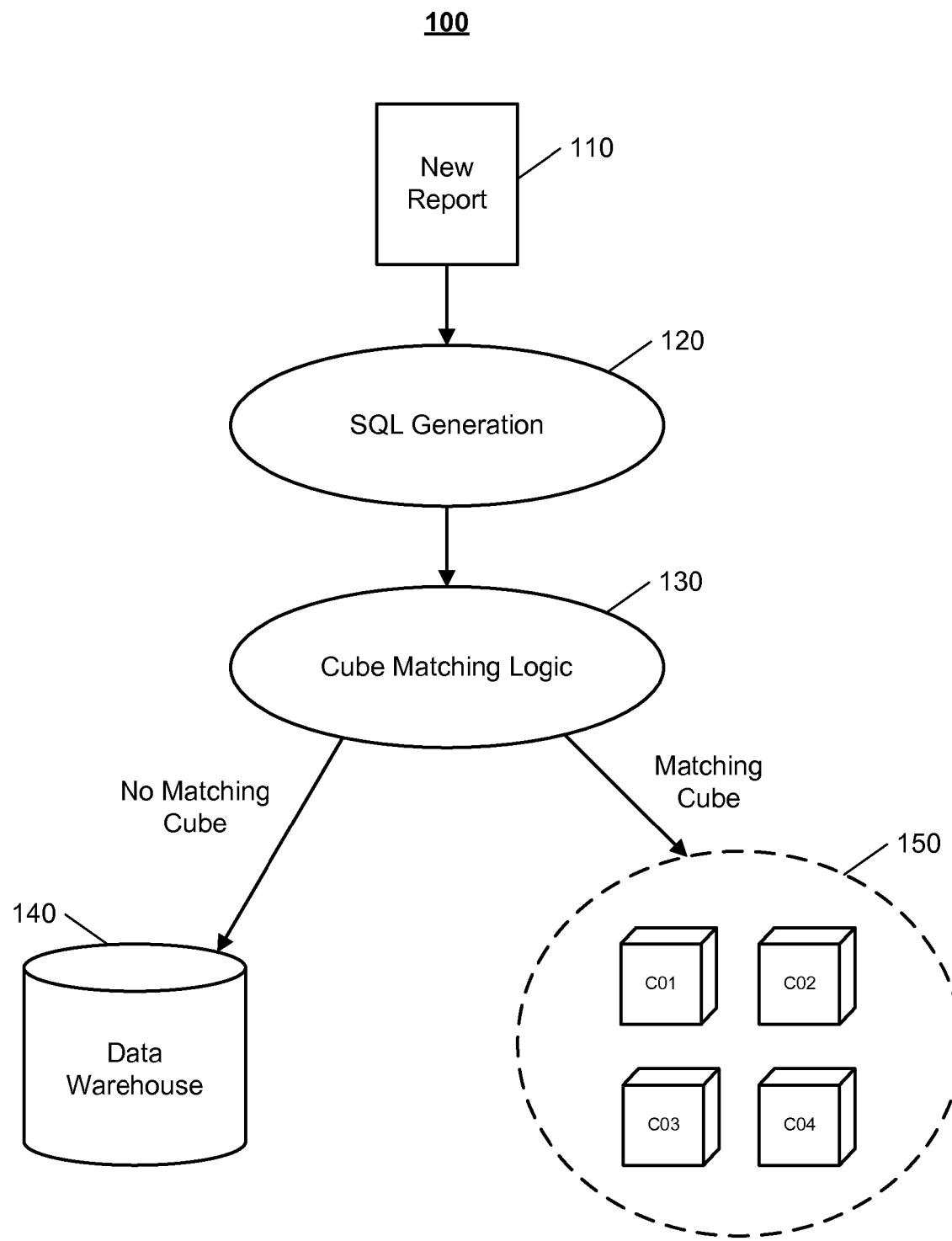
FIG. 1 illustrates a system for report generation.

FIG. 1 illustrates a system 100 for report generation. A request for a new report 110 is received. For example, an end user or an analyst may request a report using a user interface. As another example, the report 110 may be automatically generated, such as by an automated batch process. The new report 110 may have an underlying query which may be used to retrieve data to be displayed in the report 110.

The system 100 performs SQL (Structured Query Language) generation 120 to generate SQL code that defines a query used to retrieve data for the report 110. The generated SQL code may, for example, specify attributes of data to retrieve (e.g., sales, cost, region), filter parameters (e.g., criteria) used to filter data for the report 110 (e.g., sales in November of the year two thousand and nine, sales for a particular region), and calculated metrics (e.g., sum of sales by region, average sales by salesperson).

The system 100 performs cube matching logic 130 to determine whether one or more cubes 150 include sufficient data to satisfy the query used for the report 110. A cube may be a pre-processed abstraction of data stored in a database system. For example, each of the cubes 150 may be a pre-processed abstraction of data stored in a data warehouse 140. The one or more cubes 150 may be stored in a cache, such as in the memory of one or more servers. A query executed against the one or more cubes 150 is generally completed more quickly than a query executed against the data warehouse 140.

The cube matching logic 130 may include identifying information needed for satisfaction of the query (e.g., attributes, filter parameters, metrics), accessing parameter information defining data available in the cubes 150, and comparing the information needed for satisfaction of the query to the parameter information defining data available in the cubes 150. If, by performing the cube matching logic 130, the system 100 determines that one or more cubes 150 include sufficient data to satisfy the query, the query may be executed against the one or more cubes. If no cube or combination of cubes includes sufficient data to satisfy the query, at least a portion of the query may be executed against the data warehouse 140. The cube matching logic 130 is described in more detail below.

Figure 2:
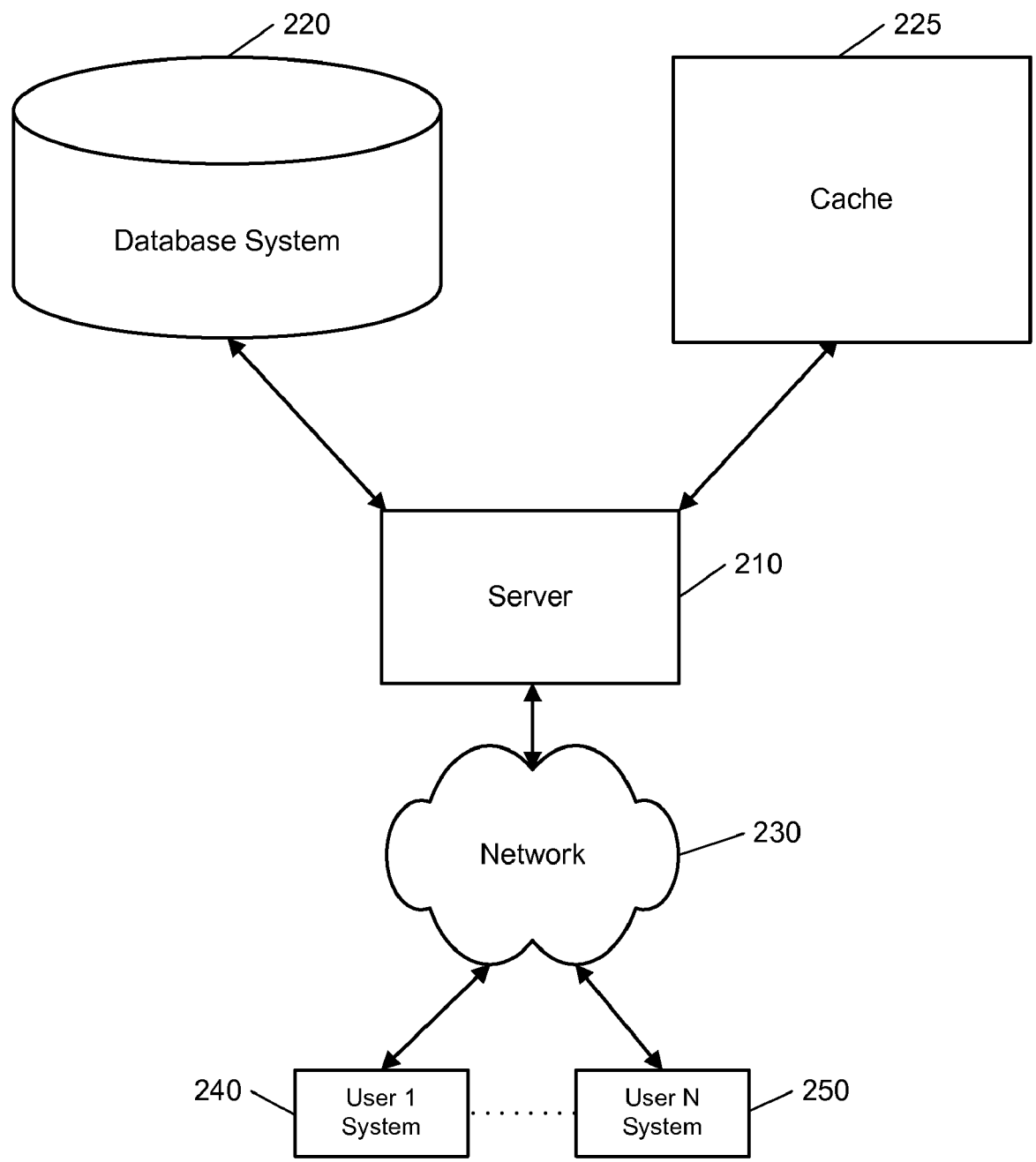
FIGS. 2 and 13 are diagrams of exemplary systems.

FIG. 2 illustrates an exemplary system 200 for report generation. The system 200 includes a server 210, a database system 220, a cache 225, a network 230, and multiple user systems 240 and 250. The network 230 enables the server 210 and the multiple user systems 240 and 250 to exchange electronic communications. The server 210 is an electronic device configured to execute programs, access data from the database system 220 and the cache 225, and exchange communications with the multiple user systems 240 and 250 over the network 230.

The database system 220 is an electronic device configured to store data and exchange communications with the server 210 (e.g., multiple servers or computers) over a direct connection or network. For example, the database system 220 may be configured to store an organization's data and output the organization's data in response to requests (e.g., SQL statements or queries). In this example, the database system 220 may exchange communications with the server 210 to receive input defining data needed from the database system 220 and provide the data needed as output to the server 210. The database system 220 may include one or more databases and/or data warehouses.

The cache 225 is electronic storage which may be used to store one or more "cubes," where a cube is a pre-processed abstraction of data stored in the database system 220. For example, memory of the server 210 may serve as the cache 225. Data may be able to be retrieved from the cache 225 more quickly than from the database system 220. Although the server 210 and the cache 225 are shown as separate items in FIG. 2, the server 210 and the cache 225 may be part of the same physical device. Alternatively, the server 210 and the cache 225 may be part of different physical devices.

The network 230 is configured to enable exchange of electronic communications between devices connected to the network 230. For example, the network 230 may be configured to enable exchange of electronic communications between the server 210 and the multiple user systems 240 and 250. The network 230 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (DSL)), radio, television, cable, satellite, or any other delivery or tunneling mechanism for carrying data. Network 230 may include multiple networks or subnetworks, each of which may include, for example, a wired or wireless data pathway. The network 230 may include a circuit-switched network, a packet-switched data network, or any other network able to carry electronic communications. For example, the network 230 may include networks based on the Internet protocol (IP) or asynchronous transfer mode (ATM).

The multiple user systems 240 and 250 each may be a general-purpose computer (e.g., a desktop personal computer, a workstation, or a laptop computer) that is configured to communicate with the server 210 over the network 230. Users of the user systems 240 and 250 may submit data requests to the server 210 over the network 230. For example, data requests may be associated with a query, such as a query used as the basis for a report. The server 210 determines whether data stored in the cache 225 is sufficient to satisfy the query. If data stored in the cache 225 is sufficient to satisfy the query, the server 210 may execute the query against the data in the cache 225. If data stored in the cache 225 is not sufficient to satisfy the query, the server 210 may execute at least a portion of the query against data in the database system 220.

In some implementations, the multiple user systems 240 and 250 may be mobile or wireless devices or devices designed for a specific function. For example, the multiple user systems 240 and 250 may include a cell phone, a smart phone, a tablet PC, a personal digital assistant ("PDA"), or any other portable device configured to communicate over a network and display information. Although FIG. 2 illustrates two user systems for brevity, actual implementations may include more (and, perhaps, many more) user systems.

When cubes are created in the cache 225, they may be "published." For example, a notification may be sent to the user systems 240 and 250 announcing the availability of new cubes. As another example, the server 210 may provide a service where the user systems 240 and 250 can request a list of available cubes. In some implementations, the server 210 occasionally synchronizes data between the database system 220 and cubes in the cache 225. When cubes are created, they may be marked as available or as not available, and the server 210 may ignore cubes marked as unavailable when determining whether cubes have sufficient data to satisfy a query request.

Figure 3:
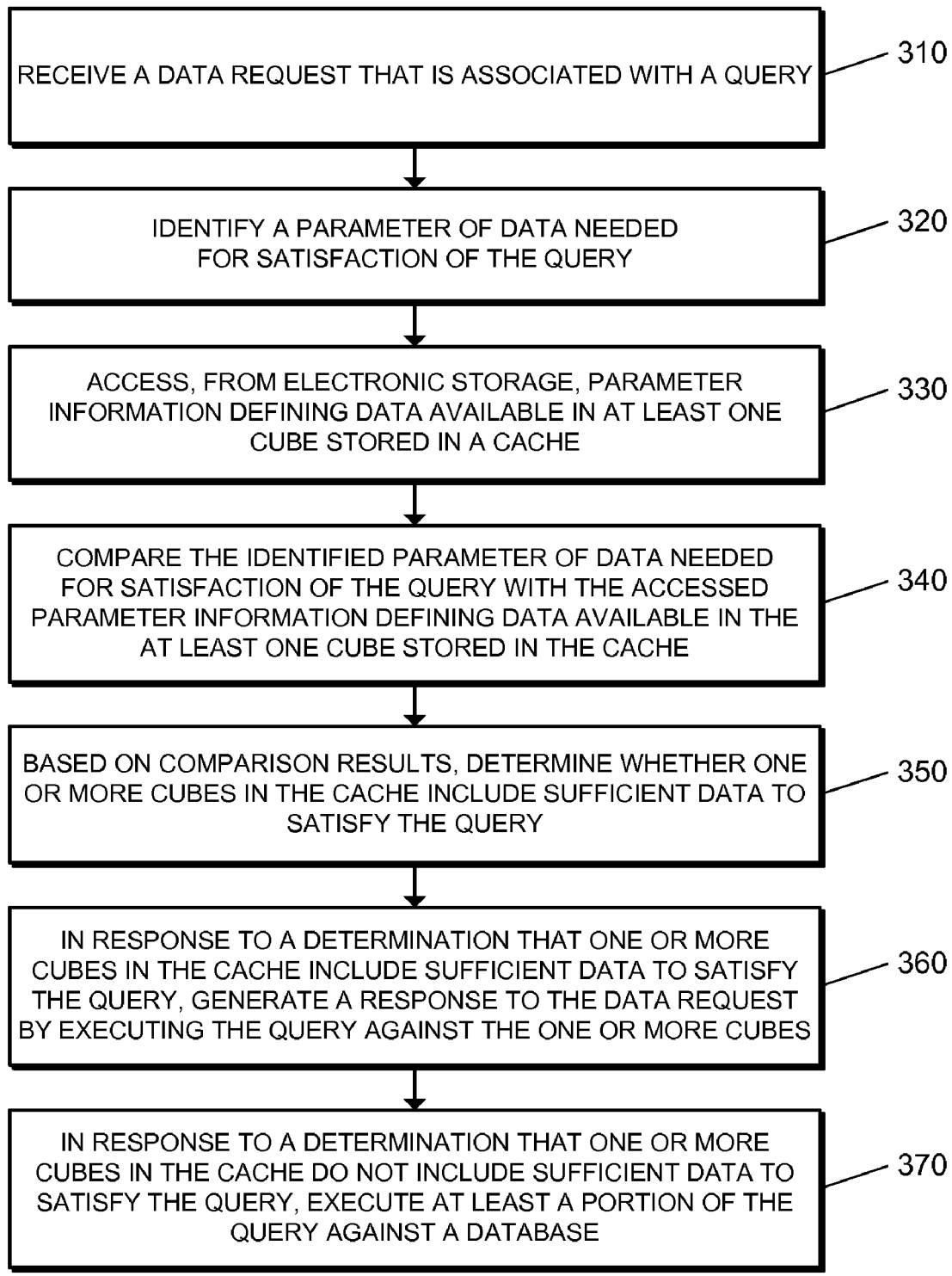
FIGS. 3, 6, 8, 9, and 11 are flowcharts of exemplary processes.

FIG. 3 illustrates a process 300 for query execution. The operations of the process 300 are described generally as being performed by the system 200. The operations of the process 300 may be performed exclusively by the server 210, may be performed exclusively by another system, or may be performed by a combination of the server 210 and another system. In some implementations, operations of the process 300 may be performed by one or more processors included in one or more electronic devices.

The system 200 receives a data request that is associated with a query (310). For example, the server 210 may receive a data request associated with a query from the user system 240 or the user system 250 over the network 230. The query may be the basis for a report. For example, a report may be based on a pre-defined query that is defined when a report definition is created. A query may be "hard-coded," where all code of the query is specified when the query is defined, or a query may be a "prompted," or "parameter" query, where parts of the query code are filled-in when the query is executed in response to a user's answers to one or more prompts.

Other types of queries may be associated with the data request. For example, the data request may be associated with a query that is included as part of executable computer program code (e.g., the query may be embedded into or otherwise included in the computer program code), and the data request may be received when the computer program code is executed. An another example, the query may be an "ad hoc" query. For example, an ad hoc query may be entered interactively by an analyst in a user interface. As yet another example, a query may be a "drilling" query, where an analyst "drills down" from summary information to more detailed information.

Figure 4:
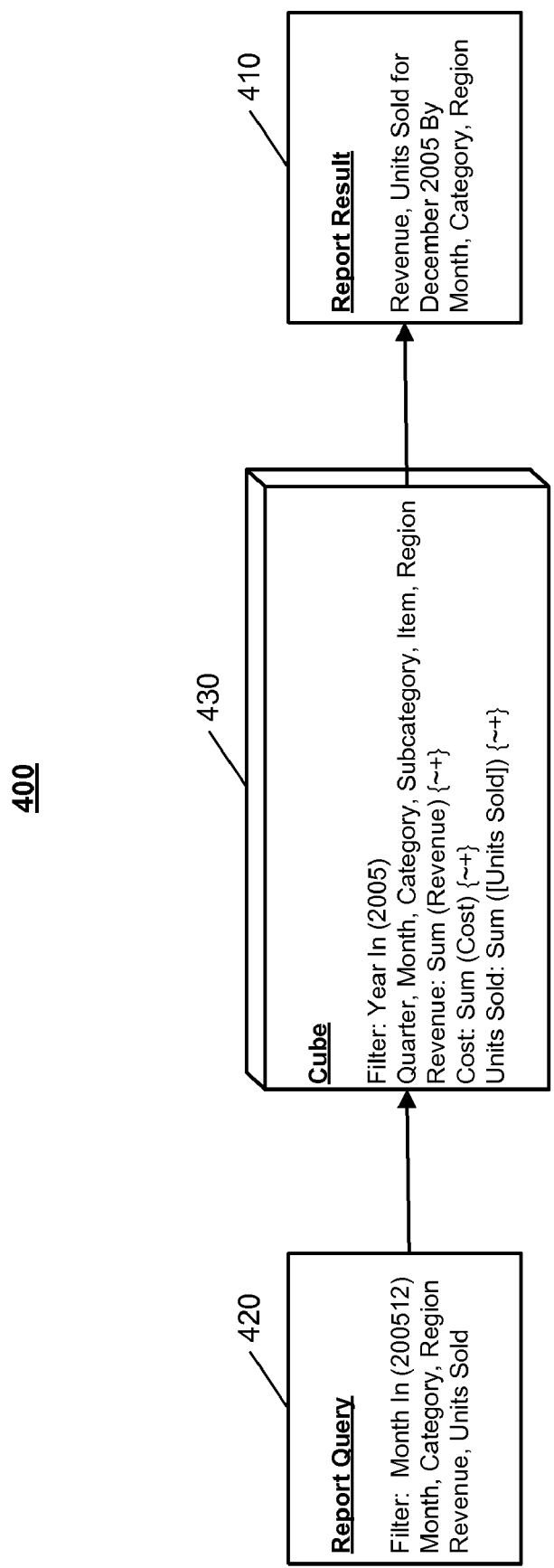
FIGS. 4, 5, 7, 10, and 12 are diagrams of exemplary reports and associated data structures.
Figure 5:
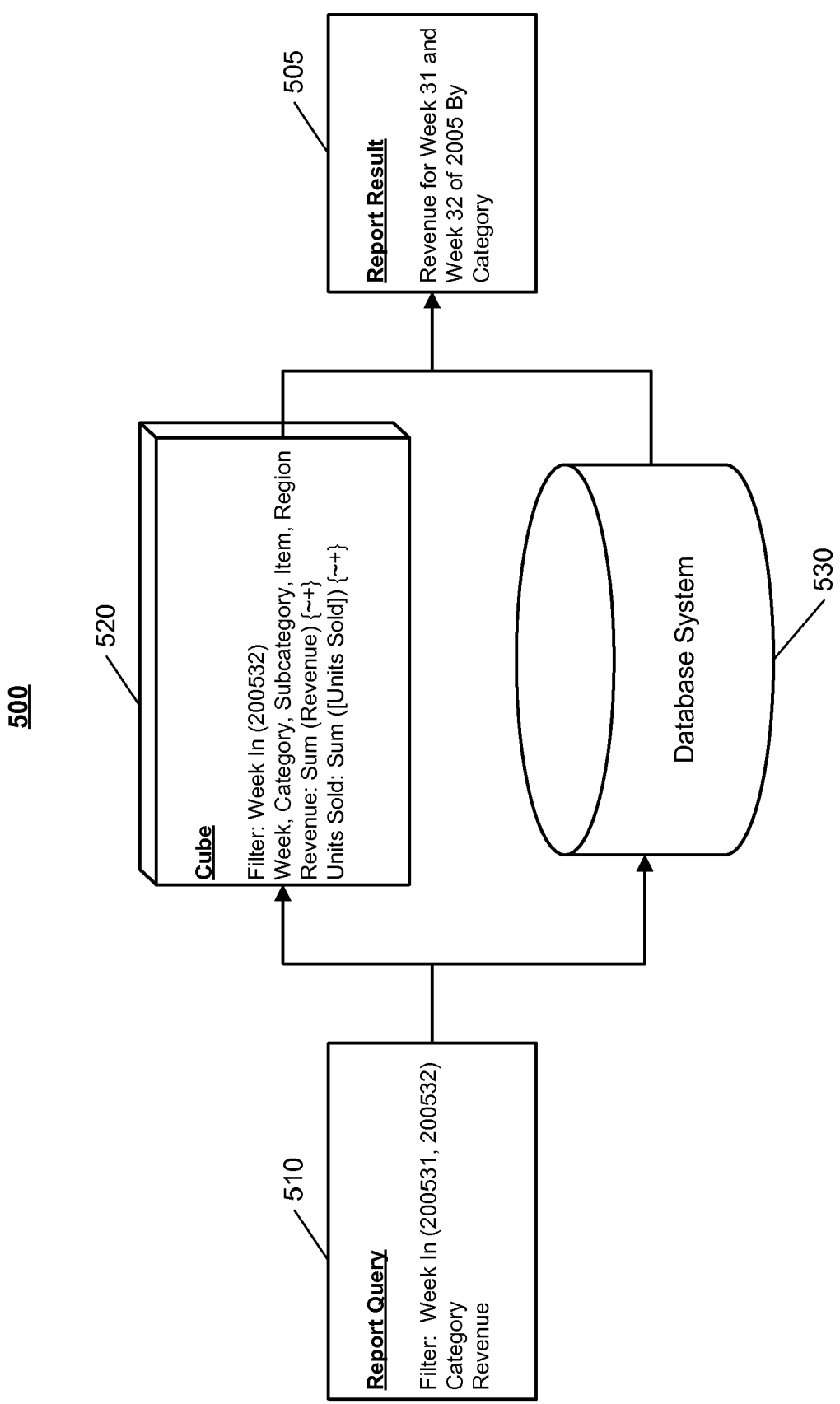

As mentioned, the query may be the basis for a report. FIGS. 4 and 5 illustrate exemplary reports and associated underlying queries. For example, FIG. 4 illustrates a diagram 400 in which a report result 410 is generated. The report result 410 displays revenue and units sold for the month of December of year two thousand five, grouped by month, category, and region. The report result 410 is based on a report query 420. Similarly, FIG. 5 illustrates a diagram 500 in which a report result 505 is generated. The report result 505 displays revenue for weeks thirty one and thirty two of year two thousand five, grouped by category. The report result 505 is based on a report query 510.

Returning to FIG. 3, the system 200 identifies a parameter of data needed for satisfaction of the query (320). Parameters of data needed for satisfaction of the query may include, for example, attributes, filter parameters, and/or metrics. An attribute is a type of data to be accessed by the query. For example and as shown in FIG. 4, the query 410 accesses month, category, and region attributes. As another example and as shown in FIG. 5, the query 510 accesses a category attribute.

A filter parameter may be needed for satisfaction of the query. A filter parameter restricts data to be displayed in a report. For example and as shown in FIG. 4, the query 420 includes a filter parameter restricting the month attribute to be the twelfth month (i.e., December) of the year two thousand five. As another example and as shown in FIG. 5, the query 510 includes a filter parameter restricting the week attribute to be either the thirty first or the thirty second week of the year two thousand five.

A metric may be needed for satisfaction of the query. A metric is a computed value. For example and as shown in FIG. 4, the query 420 includes revenue and units sold metrics, which are summations of revenue and units sold attributes, respectively. The revenue and units sold metrics may be organized by other attributes. For example, the query 420 may group revenue and units sold metrics by the month, category and region attributes. As another example and as shown in FIG. 5, the query 510 includes a revenue metric that is organized by a category attribute.

Returning to FIG. 3, the system 200 accesses, from electronic storage, parameter information defining data available in at least one cube stored in a cache (330). A cube may be a pre-processed abstraction of data stored in a database system. A cube may be implemented as one or more data structures, where a data structure may have multiple dimensions. A cube may be cached, for example, in memory of one or more server computing devices. The data in the cube may be stored in the cache prior to the receipt of the data request. Accessing data from a cube is generally faster than accessing data from a database system.

Parameter information defining data available in a cube may include, for example, attributes, filter parameters and metrics. For example and as shown in FIG. 4, a cube 430 includes quarter, month, category, subcategory, item, and region attributes. The cube 430 includes a filter parameter restricting the year attribute to include values for the year two thousand five. The cube 430 includes revenue, cost, and units sold metrics, where the revenue, cost, and units sold metrics are the summation of revenue, cost, and units sold attributes, respectively.

Filter parameters may be specified using one or more filter operators. A filter operator may be used with attributes having data types which support a "less than" operator, such as numeric, character, and date/time attributes. Filter operators can represent, for example, the following conditional tests: equals, in list, not equal, not in list, greater than, less than, greater than or equal, less than or equal, between, not between, is null, and is not null.

Returning to FIG. 3, the system 200 compares the identified parameters of data needed for satisfaction of the query with the accessed parameter information defining data available in the at least one cube stored in the cache (340). For example, attributes, filter parameters, and metrics needed for satisfaction of the query may be compared to attributes, filter parameters, and metrics defining data in one or more cubes. In the example of FIG. 4, the parameters needed for satisfaction of the query 420 may be compared to the parameters defining data available in the cube 430. In the example of FIG. 5, the parameters needed for satisfaction of the query 510 may be compared to the parameters defining data available in the cube 520.

Returning to FIG. 3, the system 200 determines, based on the comparison results, whether one or more cubes in the cache include sufficient data to satisfy the query (350). For example, the system 200 may determine whether the attributes, filter parameters, and metrics needed for satisfaction of the query are available in one or more cubes. In the example of FIG. 4, the month, category, and region attributes needed for satisfaction of the query 420 are each included in the cube 430. Therefore the cube 430 includes sufficient attributes to satisfy the query 420.

The filter parameter of the query 420 is more restrictive than the filter parameter of the cube 430. That is, the query 420 restricts month values to be December of the year two thousand five while the filter for the cube 430 filters date values in the cube 430 to have a year value of two thousand five. In other words, a date value matching the query 420 filter will also match the filter for the cube 430. Consequently, the cube 430 includes sufficient values for filtered attributes to satisfy the query 420.

The cube 430 includes pre-processed metrics for revenue, cost, and units sold, which are sufficient to satisfy the revenue and units sold metrics specified in the query 420. Since the cube 430 includes sufficient attributes, filter parameters, and metrics needed to satisfy the query 420, the system 200 determines, for the example of FIG. 4, that at least one cube in the cache includes sufficient data to satisfy the query 420.

In the example of FIG. 5, the week and category attributes needed for satisfaction of the query 510 are each included in the cube 520. Therefore, the cube 520 includes sufficient attributes to satisfy the query 510. The cube 520 includes pre-processed metrics for revenue and units sold, which are sufficient to satisfy the revenue metric specified in the query 510.

However, the filter parameter of the query 510 is less restrictive than the filter for the cube 520. That is, the filter for the query 510 restricts week values to be either the thirty first or thirty second week of the year two thousand five, while the filter for the cube 520 restricts week values to be the thirty second week of the year two thousand five. In other words, attributes having week values of the thirty first week of the year two thousand five are needed to satisfy the query 510, but week values of the thirty first week of two thousand five are not included in the cube 520. Therefore, the cube 520 does not include sufficient data to satisfy the query 510. Assuming that the cube 520 is the only cube in the cache, the system 200 determines, for the example of FIG. 5, that the cubes do not include sufficient data to satisfy the query 510.

Returning to FIG. 3, in response to a determination that one or more cubes in the cache include sufficient data to satisfy the query, the system 200 generates a response to the data request by executing the query against the one or more cubes (360). For instance, in the example of FIG. 4, the system 200 executes the query 420 against the cube 430 to produce the report result 410.

The system 200 may select a subset of multiple cubes in the cache that include sufficient data to satisfy the query and may execute the query against only the selected subset. For instance, the system 200 may execute the query by only accessing information in the cache, and without accessing a database system. The query may be executed against the cache even if a report does not specify or indicate that the cache should be used (e.g., report designers do not need to configure reports to run against cubes in the cache).

Returning to FIG. 3, in response to a determination that one or more cubes in the cache do not include sufficient data to satisfy the query, the system 200 executes at least a portion of the query against a database (370). For instance, in the example of FIG. 5, the system 200 executes at least a portion of the query 510 against a database 530. For example, the system 200 may execute the part of the query 510 associated with the thirty first week of the year two thousand five against the database 530 and may execute the part of the query 510 associated with the thirty second week of the year two thousand five against the cube 520. In this example, the system 200 produces to the report 505 by combining the results received from the cube 520 with the results received from the database 530. In some implementations, the system 200 may log reasons for why particular cubes or combinations of cubes did not have sufficient data to satisfy a particular query.

Figure 6:
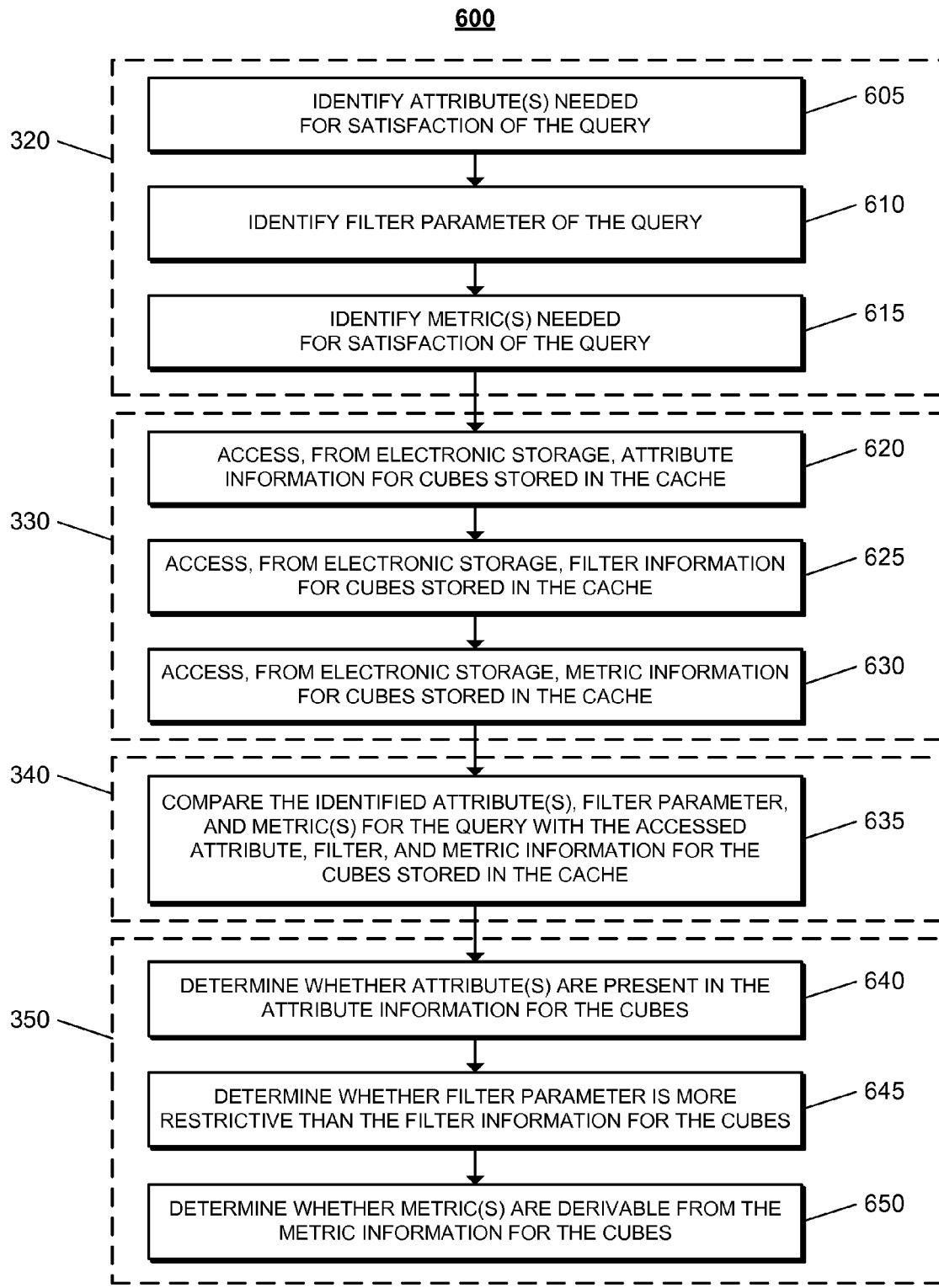

FIG. 6 illustrates a process 600 for determining whether a cube has sufficient data to satisfy a query. The operations of the process 600 are described generally as being performed by the system 200. The operations of the process 600 may be performed exclusively by the server 210, may be performed exclusively by another system, or may be performed by a combination of the server 210 and another system. In some implementations, operations of the process 600 may be performed by one or more processors included in one or more electronic devices.

FIG. 6 describes in additional detail some of the processing steps of the process 300 described above in reference to FIG. 3. For example, steps 605, 610, and 615 described below may be used in identifying parameters of data needed for satisfaction of the query referenced above with respect to reference numeral 320. Steps 620, 625, and 630 described below may be used in accessing parameter information describing data available in at least one cube stored in a cache referenced above with respect to reference numeral 330. Step 635 described below may be used in comparing the identified parameter of data needed for satisfaction of the query with the accessed parameter information defining data available in the at least one cube stored in a cache referenced above with respect to reference numeral 340. Steps 640, 645, and 650 described below may be used in determining whether one or more cubes in the cache include sufficient data to satisfy the query referenced above with respect to reference numeral 350.

Figure 7:
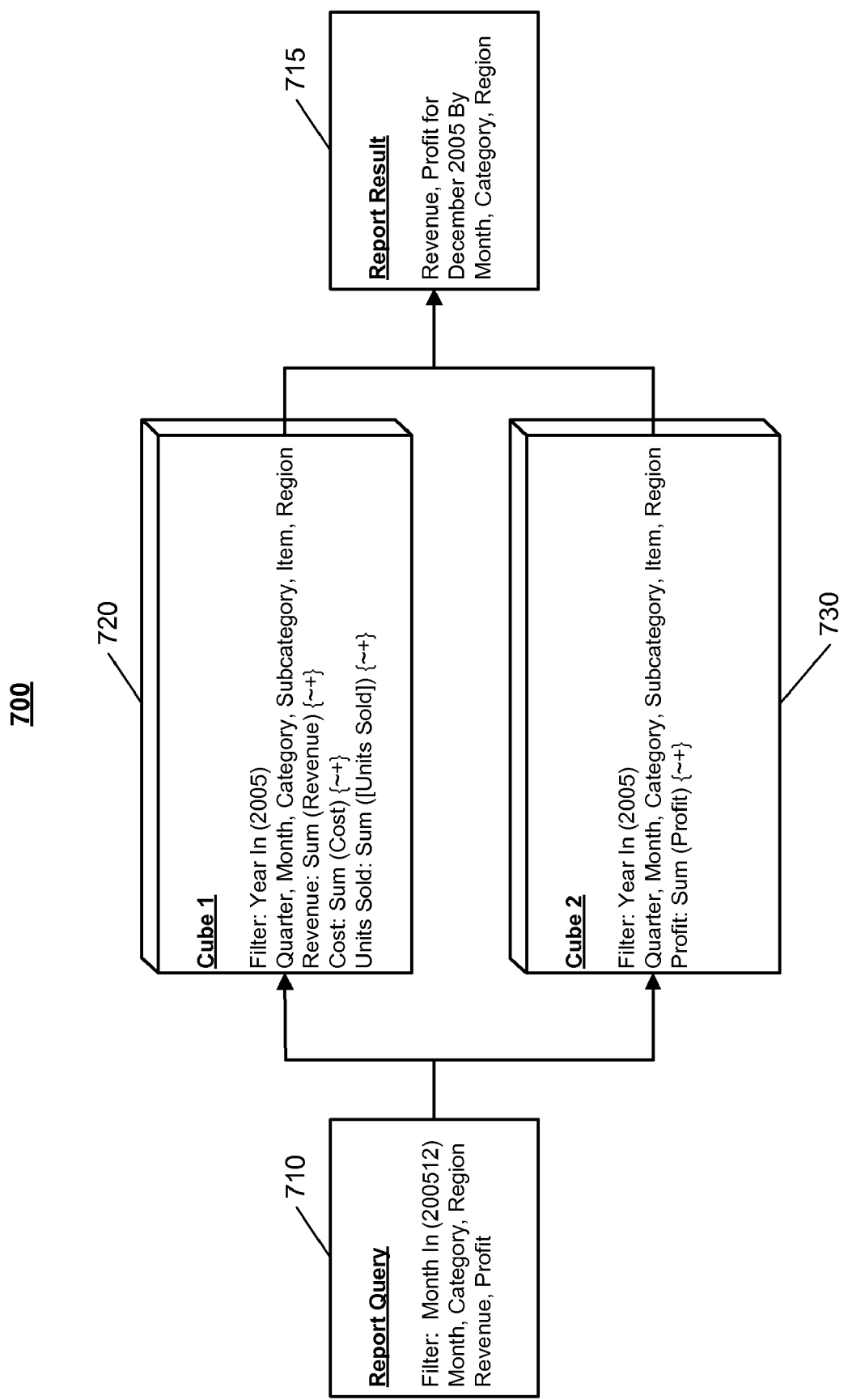

Referring to FIG. 6, the system 200 identifies one or more attributes needed for satisfaction of the query (605). For example, the system 200 may identify attributes needed for satisfaction of a query 710 illustrated in FIG. 7. FIG. 7 illustrates a diagram 700 in which a report result 715 is generated based on the query 710. The system 200 may identify, for example, month, category, region, revenue, and profit attributes which are needed for satisfaction of the query 710.

Returning to FIG. 6, the system 200 identifies one or more filter parameters of the query (610). As mentioned above, a filter parameter may be used to filter retrieved data. For example, the system 200 may, as shown in FIG. 7, identify a filter parameter restricting month values to be December of the year two thousand five for the query 710.

Returning to FIG. 6, the system 200 identifies one or more metrics needed for satisfaction of the query (615). As mentioned above, a metric is a computed value. For example, the system 200 may, as shown in FIG. 7, identify revenue and profit metrics needed for satisfaction of the query 710, where the revenue and profit metrics are summations of revenue and profit attributes, respectively.

Returning to FIG. 6, the system 200 accesses, from electronic storage, attribute information for cubes stored in the cache (620). Attribute information may be accessed for one cube or for multiple cubes, where each cube is a data structure which may be stored, for example, in memory of a server computing device. For example, as shown in FIG. 7, attribute information for cubes 720 and 730 may be accessed. The cube 720 includes attribute information for quarter, month, category, subcategory, item, region, revenue, cost, and units sold attributes. The cube 730 includes attribute information for quarter, month, category, subcategory, item, region, and profit attributes.

Returning to FIG. 6, the system 200 accesses, from electronic storage, filter information for cubes stored in the cache (625). Filter information may be accessed for one or more cubes. For example, as shown in FIG. 7, the cubes 720 and 730 each include a filter which restricts date values to be in the year two thousand five.

Returning to FIG. 6, the system 200 accesses, from electronic storage, metric information for cubes stored in the cache (630). Metric information may be accessed for one or more cubes. For example, as shown in FIG. 7, the cube 720 includes revenue, cost, and units sold metrics and the cube 730 includes a profit metric.

The system 200 compares the identified attribute(s), filter parameter(s), and metric(s) for the query with the accessed attribute, filter, and metric information for the cubes stored in the cache (635). As described in more detail below with respect to FIGS. 8 to 12, attribute information may be compared to determine whether attributes needed for satisfaction of the query are present in a single cube or collectively in multiple cubes. Additionally, filter parameters may be compared to determine whether a filter parameter of the query is more restrictive or less restrictive than filter information for the cubes and metric information may be compared to determine whether one or more query metrics are derivable from metric information for the cubes.

The system 200 determines whether one or more attributes are present in the attribute information for the cubes (640). Determining whether one or more attributes are present in the attribute information for the cubes is described in more detail below with respect to FIG. 8.

The system 200 determines whether a filter parameter is more restrictive than the filter information for the cubes (645). Determining whether a filter parameter is more restrictive than the filter information for the cubes is described in more detail below with respect to FIG. 9.

The system 200 determines whether one or more metrics are derivable from the metric information for the cubes (650). Determining whether one or more metrics are derivable from the metric information for the cubes is described in more detail below with respect to FIG. 11.

Figure 8:
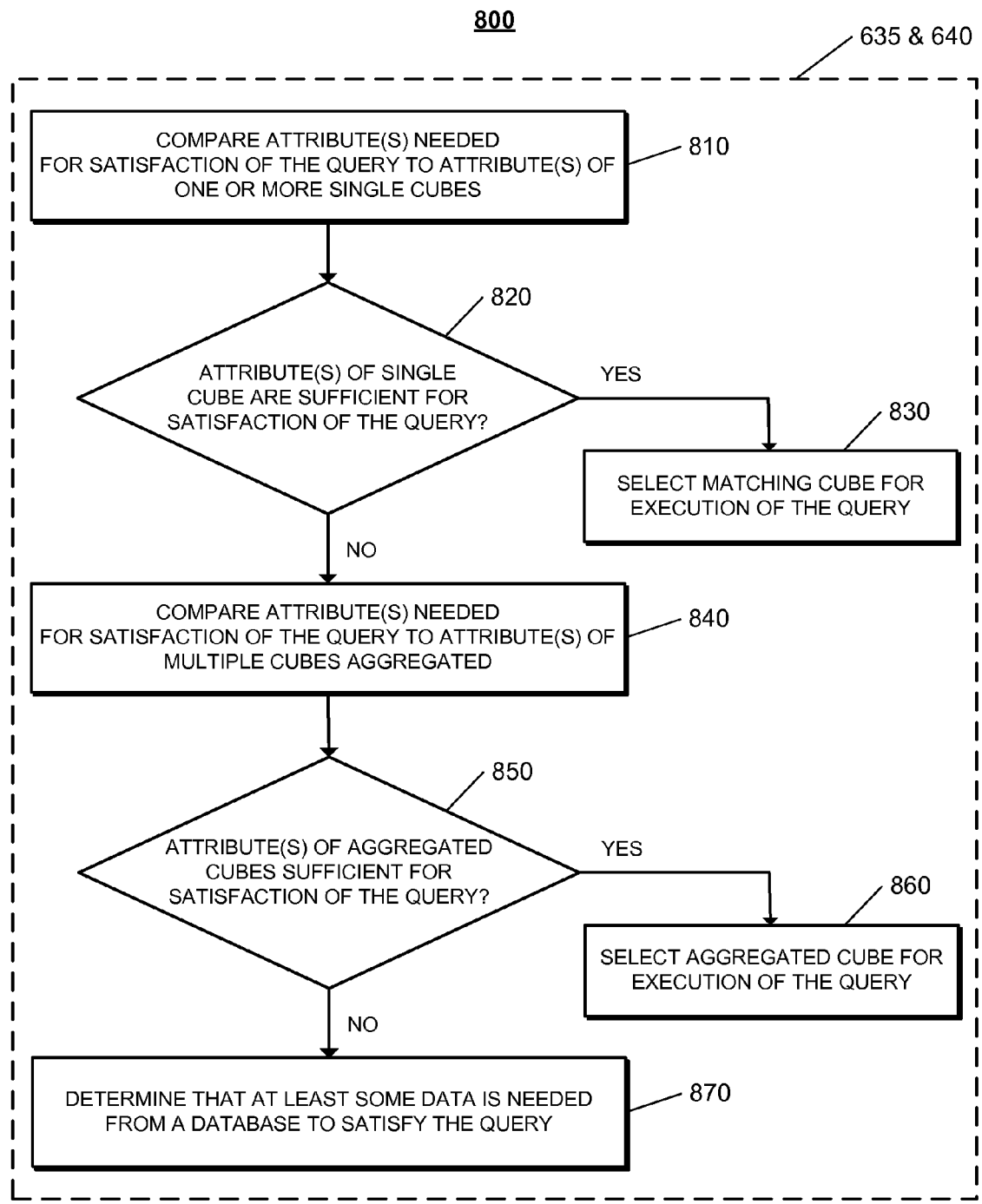

FIG. 8 illustrates a process 800 for determining whether one or more query attributes are present in cube attribute information. The process 800 may used in comparing the identified attribute(s), filter parameter, and metric(s) for the query with the accessed attribute, filter, and metric information for the cubes stored in the cache referenced above with respect to reference numeral 635 and in determining whether attribute(s) are present in the attribute information for the cubes referenced above with respect to reference numeral 640. The operations of the process 800 are described generally as being performed by the system 200. The operations of the process 800 may be performed exclusively by the server 210, may be performed exclusively by another system, or may be performed by a combination of the server 210 and another system. In some implementations, operations of the process 800 may be performed by one or more processors included in one or more electronic devices.

The system 200 compares one or more attributes needed for satisfaction of the query to one or more attributes of one or more single cubes (810). For example, as shown in FIG. 7, the system 200 may compare attributes needed for satisfaction of the query 710 to attribute information of the cube 720 and/or the cube 730. Month, category, region, revenue, and profit attributes are needed for satisfaction of the query 710. The cube 720 includes attribute information for quarter, month, category, subcategory, item, region, revenue, cost, and units sold. The cube 730 includes attribute information for quarter, month, category, subcategory, item, region, and profit.

Returning to FIG. 8, the system 200 determines whether one or more attributes of a single cube are sufficient for satisfaction of the query (820). For instance, in the example of FIG. 7, the system 200 may determine that the cube 720 includes attribute information for month, category, region, and revenue attributes, but does not include attribute information for a profit attribute needed for the query 710. Similarly, the system 200 may determine that the cube 730 includes attribute information for month, category, region, and profit attributes, but does not include attribute information for a revenue attribute needed for the query 710.

If one or more attributes of a single cube are sufficient for satisfaction of the query, the system 200 selects a matching cube for execution of the query (830). In the example of FIG. 7, no single cube has sufficient attribute information to satisfy the query 710, as both the cube 720 and the cube 730 are missing a needed attribute. Suppose, however, that in another example that the cube 720 included a profit attribute and that the cube 730 included a revenue attribute. In this adapted example, either the cube 720 or the cube 730 may be selected for execution of the query 710.

Returning to FIG. 8, if no combination of one or more attributes of a single cube is sufficient for satisfaction of the query, the system 200 compares one or more attributes needed for satisfaction of the query to one or more attributes of two or more aggregated cubes (840). For instance, in the example of FIG. 7, no single cube (e.g., neither the cube 720 nor the cube 730) includes attributes sufficient for satisfaction of the query 710. The system 200 may compare attributes needed for satisfaction of the query 710 to the attribute information of an aggregation of the cube 720 and the cube 730.

Returning to FIG. 8, the system 200 determines whether one or more attributes of two or more aggregated cubes are sufficient for satisfaction of the query (850). For instance, in the example of FIG. 7, the system 200 may determine that an aggregation of the cubes 720 and 730 has all of the month, category, region, revenue, and profit attributes needed for satisfaction of the query 710.

Returning to FIG. 8, if one or more attributes of two or more aggregated cubes are sufficient for satisfaction of the query, the system 200 selects the two or more aggregated cubes for execution of the query (860). For instance, in the example of FIG. 7, the system 200 may select the cubes 720 and 730 for execution of the query 710. If more than one combination of aggregated cubes includes attributes sufficient for satisfaction of the query, the system 200 may select a combination of aggregated cubes that enables satisfaction of the query in the least amount of time. For example, the smallest aggregation may be selected.

Returning to FIG. 8, if no combination of one or more attributes of two or more aggregated cubes is sufficient for satisfaction of the query, the system 200 determines that at least some data is needed from a database to satisfy the query (870). For instance, in the example of FIG. 5, where no cube or combination of aggregated cubes is sufficient to satisfy the query 510, the system 200 may determine that data is needed from the database system 530 to satisfy the query 510.

Figure 9:
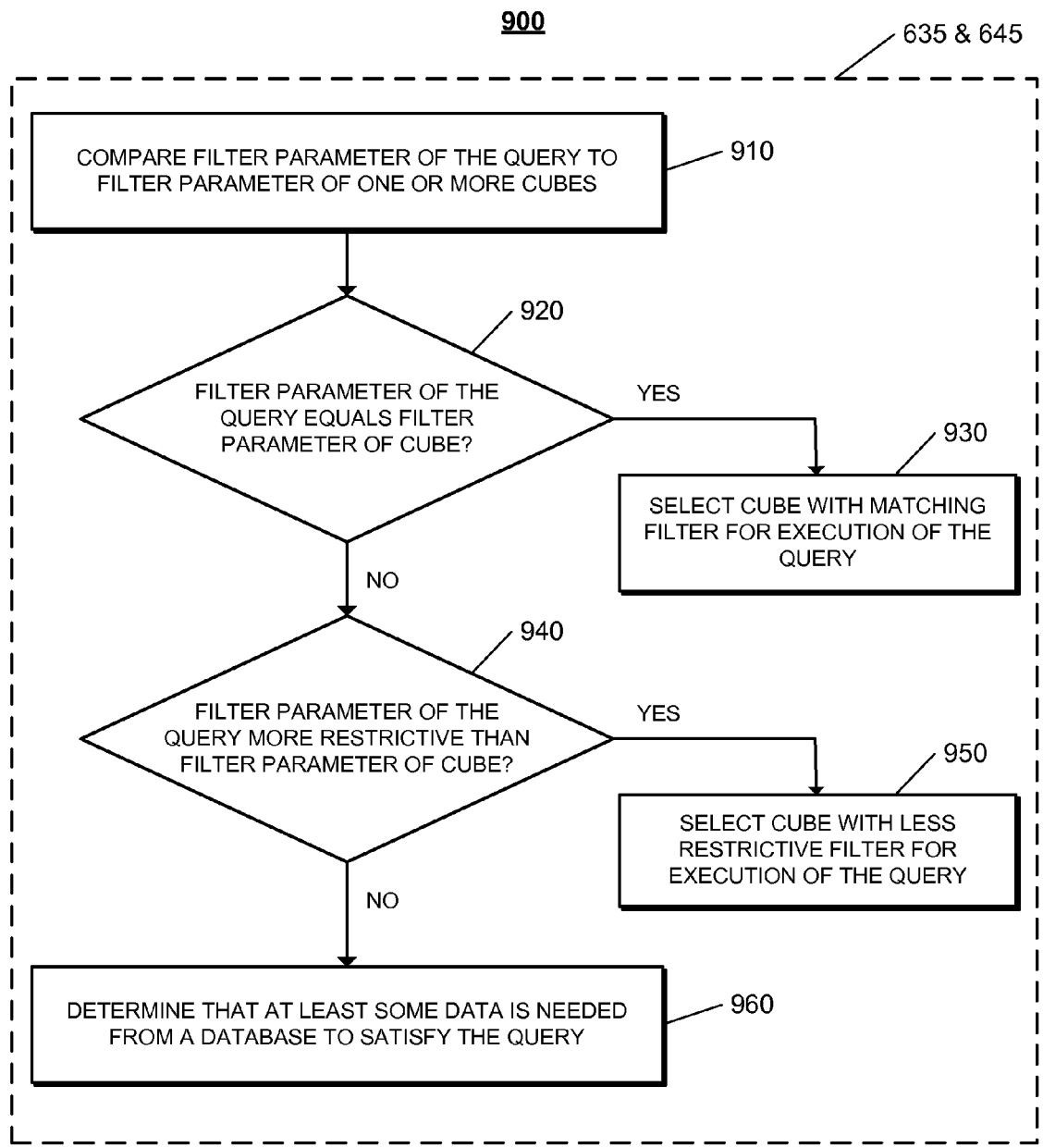

FIG. 9 illustrates a process 900 for determining whether a filter parameter is more restrictive than the filter information for one or more cubes. The process 900 may be used in comparing the identified attribute(s), filter parameter, and metric(s) for the query with the accessed attribute, filter, and metric information for the cubes stored in the cache referenced above with respect to reference numeral 635 and in determining whether a filter parameter of a query is more restrictive than the filter information for one or more cubes referenced above with respect to reference numeral 645. The operations of the process 900 are described generally as being performed by the system 200. The operations of the process 900 may be performed exclusively by the server 210, may be performed exclusively by another system, or may be performed by a combination of the server 210 and another system. In some implementations, operations of the process 900 may be performed by one or more processors included in one or more electronic devices.

Figure 10:
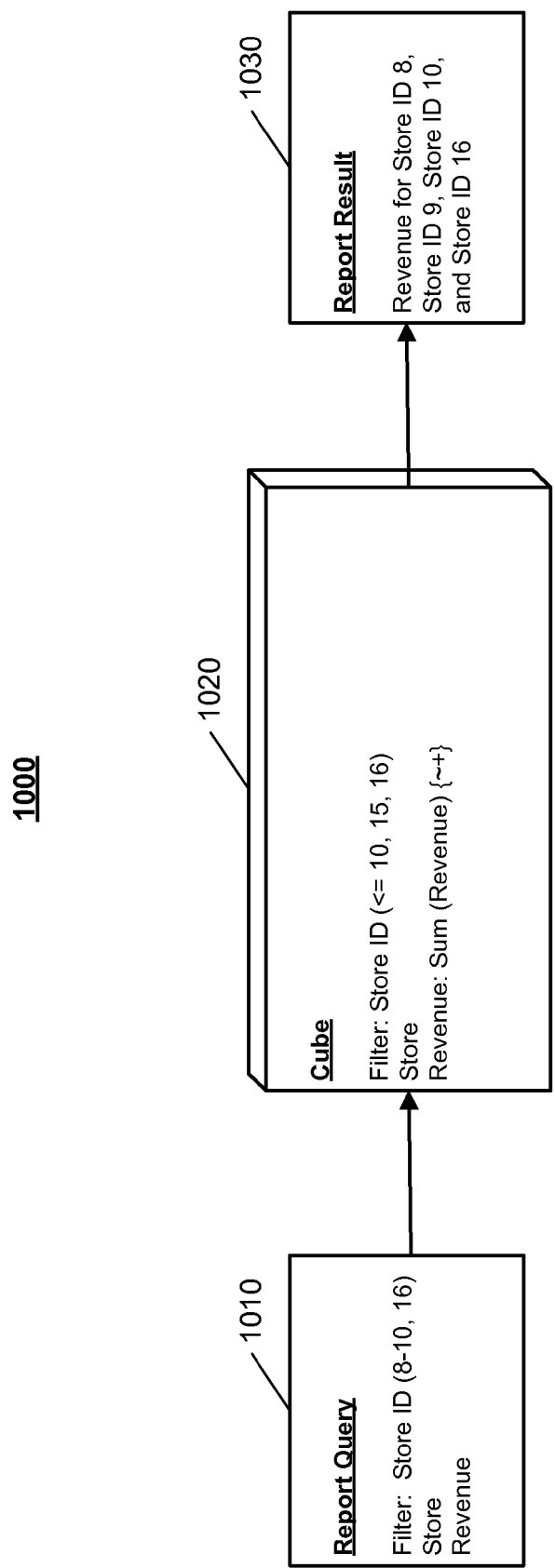

The system 200 compares one or more filter parameters of the query to one or more filter parameters of one or more cubes (910). For example, as shown in FIG. 10, a filter parameter of a report query 1010 may be compared to a filter parameter of a cube 1020. The report query 1010 is used as a basis for generation of a report result 1030. The report query 1010 includes a filter parameter restricting a store identifier to have a value in the range of eight to ten, inclusive, or equal to the value sixteen. The cube 1020 includes a filter parameter restricting a store identifier to have a value less than or equal to ten, equal to fifteen, or equal to sixteen.

Returning to FIG. 9, the system 200 determines whether a filter parameter of the query is equivalent to a filter parameter of a cube (920). For instance, in the example of FIG. 10, the system 200 may determine that the filter parameter of the query 1010 is not equivalent to the filter parameter of the cube 1020. In another example, the system 200 may determine, for example, that a filter parameter of a query and a filter parameter of a cube both restrict year attribute values to be equal to the year two thousand five.

If a filter parameter of the query is equivalent to a filter parameter of a cube, the system 200 selects the cube with the matching filter for execution of the query (930). For example, in the example where a filter parameter of a query and a filter parameter of a particular cube both restrict year attribute values to be equal to the year two thousand five, the system 200 may select the cube for execution of the query. If more than one cube includes a filter parameter equivalent to the filter parameter of the query, the system 200 may select the cube that enables satisfaction of the query in the least amount of time.

If a filter parameter of the query is not equivalent to a filter parameter of a cube, the system 200 determines whether a filter parameter of the query is more restrictive than a filter parameter of a cube (940). If a filter parameter of the query is more restrictive than the filter parameter of a cube, an attribute value matching the query filter parameter will also match the filter parameter for the cube. If a filter parameter of the query is less restrictive than the filter parameter of a cube, an attribute value matching the query filter parameter may not match the filter parameter for the cube. In other words, a value needed for satisfaction of the query may not be available in the cube.

For instance, in the example of FIG. 10, the system 200 may determine that the filter parameter for the query 1010 is more restrictive than the filter parameter for the cube 1020. For example, the filter parameter for the query 1010 does not allow store identifier values between one to seven, inclusive, or the value fifteen, while the filter parameter for the cube 1020 does allow store identifier values from one to seven, inclusive, and the value fifteen.

Returning to FIG. 9, if a filter parameter of the query is more restrictive than a filter parameter of a cube, the system 200 selects the cube with the less restrictive filter for execution of the query (950). For instance, in the example of FIG. 10, where the cube 1020 has a less restrictive filter than the query 1010, the system 200 may select the cube 1020 for execution of the query 1010. If more than one cube includes a filter parameter that is less restrictive than the query, the system 200 may select the cube that enables satisfaction of the query in the least amount of time.

Returning to FIG. 9, if no filter parameters of any cube are less restrictive than the filter parameter the query, the system 200 determines that at least some data is needed from a database to satisfy the query (960). For example, in reference to FIG. 2, if the server 210 determines that no filter parameters of any cube in the cache 225 are less restrictive than a filter parameter of a query request received from the user system 250, the server 210 may determine that at least some data is needed from the database system 220 to satisfy the received query request.

Figure 11:
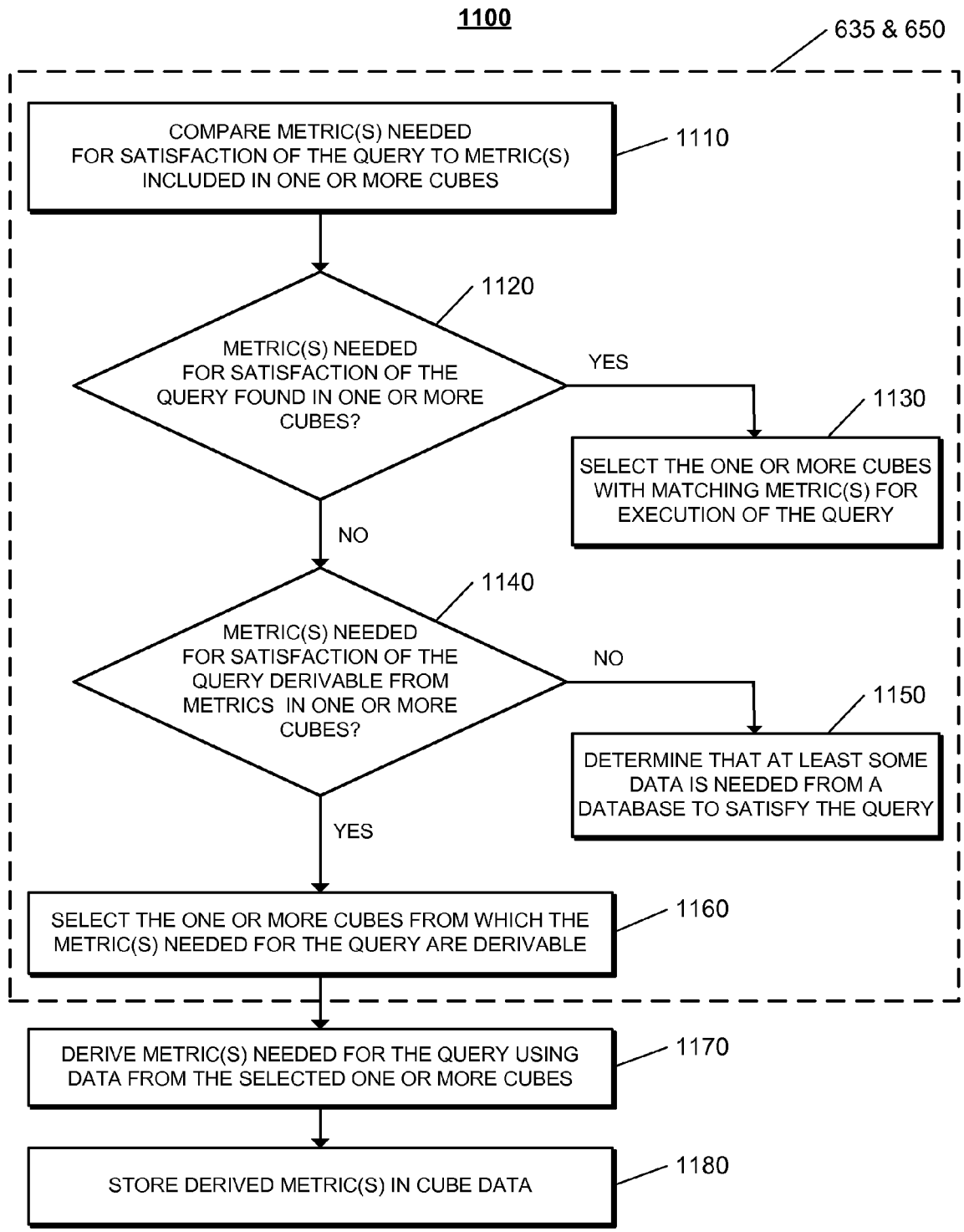

FIG. 11 illustrates a process 1100 for determining whether one or more query metrics are derivable from cube metric information. Steps 1110 to 1160 of the process 1100 may used in comparing the identified attribute(s), filter parameter, and metric(s) for the query with the accessed attribute, filter, and metric information for the cubes stored in the cache referenced above with respect to reference numeral 635 and in determining whether metrics(s) are derivable from the metric information for the cubes referenced above with respect to reference numeral 650. The operations of the process 1100 are described generally as being performed by the system 200. The operations of the process 1100 may be performed exclusively by the server 210, may be performed exclusively by another system, or may be performed by a combination of the server 210 and another system. In some implementations, operations of the process 1100 may be performed by one or more processors included in one or more electronic devices.

Figure 12:
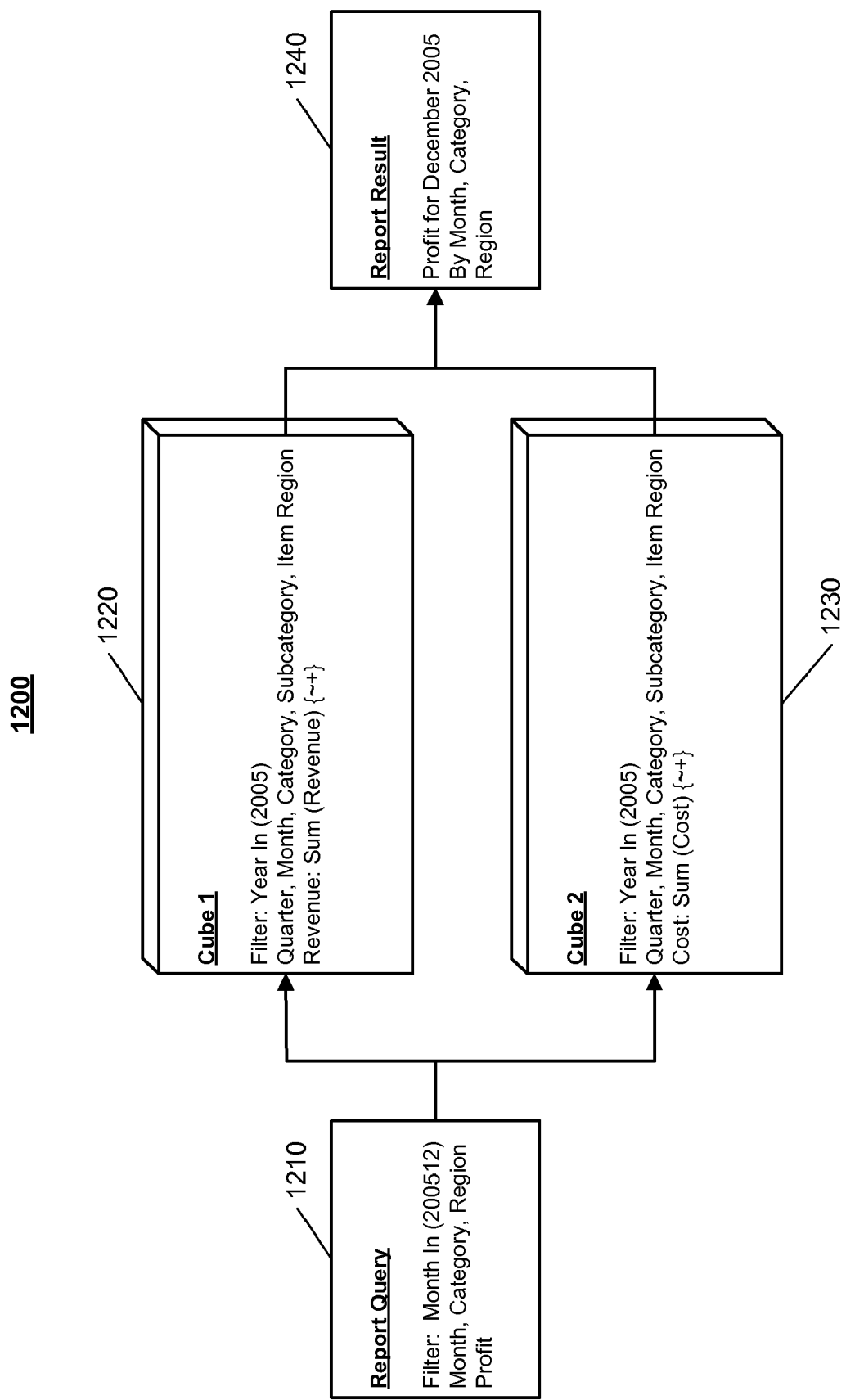

The system 200 compares one or more metrics needed for satisfaction of the query to one or more metrics included in one or more cubes (1110). For example, as shown in FIG. 12, metrics for a report query 1210 may be compared to metric information for a cube 1220 and metric information for a cube 1230. The report query 1210 is used as a basis for generation of a report result 1240. The report query 1210 includes a profit metric. The cube 1220 includes a revenue metric and the cube 1230 includes a cost metric. As another example and as shown in FIG. 4, metrics for the report query 420 may be compared to metric information for the cube 430. The report query 420 includes revenue and units sold metrics. The cube 430 includes revenue, cost, and units sold metrics.

In some implementations, the system 200 compares the filter of the query to the metrics of the cube. For example, a cube may have a filter of Year equals 2005, but also includes metrics that have more restrictive filters, such as Sales Quarter One of 2005 and Sales Quarter Two of 2005. In this example, a query searching for Sales Quarter Three of 2005 would not hit the cube, but a query searching for Sales Quarter One of 2005 would hit the cube. As such, the system 200 matches metrics to metrics and also concurrently accounts for filtering.

Returning to FIG. 11, the system 200 determines whether metrics(s) needed for satisfaction of the query are found in one or more cubes (1120). For instance, in the example of FIG. 12, the system 200 may determine that the profit metric needed for satisfaction of the query 1210 is not found in the metric information for the cube 1220 or the metric information for the cube 1230. However, in the example of FIG. 4, the system 200 may determine that the revenue and units sold metrics needed for satisfaction of the report query 420 are found in the cube 430.

In some examples, the system 200 takes into account whether the combination of metrics in a single cube could eliminate rows. For instance, suppose a cube includes Units Sold and Units Received (e.g., inventory shipments). Now on any given day, a store may not sell every item it stocks nor take new stock of every item it sells—the list of items may be different. The cube may be built such that it contains only items that are both sold and were restocked on the same day, or it could be built so that it contains all items, regardless of whether there were any units sold or received. When matching a query to a cube, the system 200 may take that into account in deciding whether the cube may be used.

If the metric(s) needed for satisfaction of the query are found in one or more cubes, the system 200 selects the one or more cubes with matching metric(s) for execution of the query (1130). For instance, in the example of FIG. 4 where the cube 430 includes metrics matching the metrics needed for the query 420, the system 200 may select the cube 430 for execution of the query 420.

Returning to FIG. 11, if the metric(s) needed for satisfaction of the query are not found in one or more cubes, the system 200 determines whether metric(s) needed for satisfaction of the query are derivable from one or more metrics in one or more cubes (1140). For instance, in the example of FIG. 12 where neither the cube 1220 nor the cube 1230 include the profit metric needed for the satisfaction of the query 1210, the system 200 may determine whether the needed profit metric is derivable from one or more metrics included in the cubes 1220 and 1230. For example, the system 200 may determine that the profit metric needed for the query 1210 may be calculated by subtracting cost metric information from the cube 1230 from revenue metric information from the cube 1220.

Returning to FIG. 11, if metric(s) needed for satisfaction of the query are not derivable from one or more metrics in one or more cubes, the system 200 determines that at least some data is needed from a database to satisfy the query (1150). For example, in reference to FIG. 2, if the server 210 determines that metrics needed for satisfaction of a query request received from the user system 250 are not derivable from metric information from cubes in the cache 225, the server 210 may determine that at least some data is needed from the database system 220 to satisfy the received query request.

Returning to FIG. 11, if metric(s) needed for satisfaction of the query are derivable from one or more metrics in one or more cubes, the system 200 selects the one or more cubes from which the metric(s) needed for the query are derivable (1160). For instance, in the example of FIG. 12 where the profit metric needed for satisfaction of the query 1210 is derivable from metric information in the cubes 1220 and 1230, the system 200 may select the cubes 1220 and 1230.

Returning to FIG. 11, the system 200 derives metric(s) needed for the query using data from the selected one or more cubes (1170). For instance, in the example of FIG. 12, the system 200 may derive the profit metric needed for the query 1210 by subtracting cost metric information from the cube 1230 from revenue metric information from the cube 1220.

The system 200 stores the derived metric(s) in cube data (1180). For instance, in the example of FIG. 12, the system 200 may store the derived profit metric in any or all of the cube 1220, the cube 1230, or a newly created cube. The derived profit metric may be used directly the next time a query requesting the derived profit metric is received.

Figure 13:
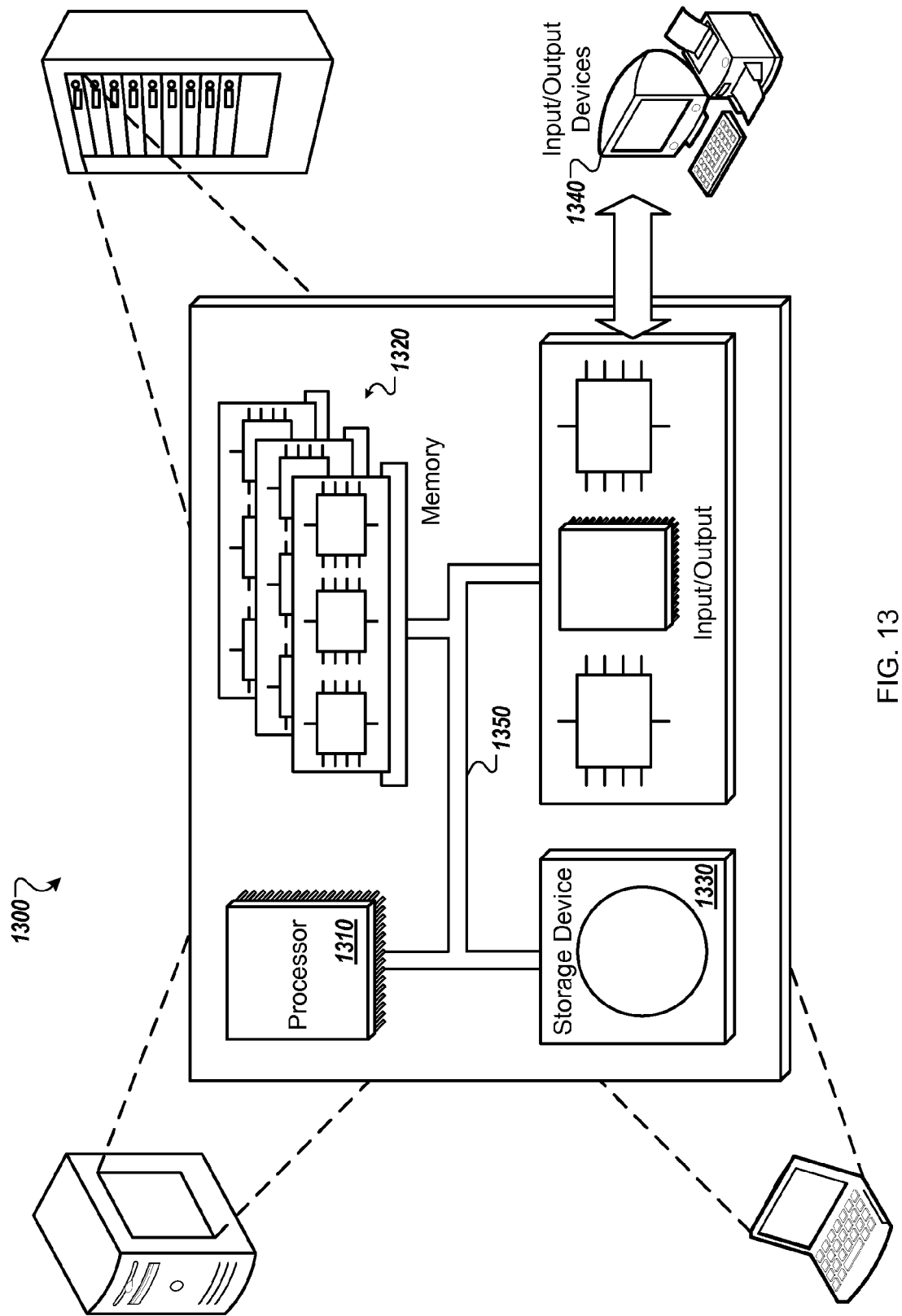

FIG. 13 is a schematic diagram of an example of a generic computer system 1300. The system 1300 can be used for the operations described in association with the processes 300, 600, 700, 900, and 1100, according to one implementation. For example, the system 1300 may be included in the server system 210.

The system 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to display graphical information for a user interface on the input/output device 1340.

The memory 1320 stores information within the system 1300. In one implementation, the memory 1320 is a computer-readable medium. In one implementation, the memory 1320 is a volatile memory unit. In another implementation, the memory 1320 is a non-volatile memory unit.

The storage device 1330 is capable of providing mass storage for the system 1300. In one implementation, the storage device 1330 is a computer-readable medium. In various different implementations, the storage device 1330 may be a floppy disk device, a hard disk device, an optical disk device, or a tape device.

The input/output device 1340 provides input/output operations for the system 1300. In one implementation, the input/output device 1340 includes a keyboard and/or pointing device. In another implementation, the input/output device 1340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. The computer having the display device may be a mobile device with an integrated display (e.g., a smart phone).

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
receiving a data request that is associated with a query;
identifying one or more attributes of data needed for satisfaction of the query;
accessing, from electronic storage, attribute information for cubes stored in a cache, the cubes being pre-processed abstractions of data from a database system and being stored in the cache prior to receipt of the data request;
comparing the identified one or more attributes of data needed for satisfaction of the query with attributes of one or more single cubes in the cache;
determining that attributes of a single cube are not sufficient for satisfaction of the query;
in response to the determination that attributes of a single cube are not sufficient for satisfaction of the query:
comparing the identified one or more attributes of data needed for satisfaction of the query with an aggregation of attributes of multiple cubes in the cache;
determining that attributes of two or more aggregated cubes are sufficient for satisfaction of the query;
in response to the determination that attributes of two or more aggregated cubes are sufficient for satisfaction of the query, selecting the two or more aggregated cubes having sufficient attributes for execution of the query; and
in response to selection of the two or more aggregated cubes having sufficient attributes for execution of the query, generating a response to the data request by executing the query against the two or more aggregated cubes in the cache.

2. The method of claim 1 wherein receiving the data request that is associated with the query comprises receiving a query.

3. The method of claim 1 wherein receiving the data request that is associated with the query comprises receiving a report generation request that requires execution of a query to gather data required to generate the report.

4. A computer-implemented method comprising:
receiving a data request that is associated with a query;
identifying a filter parameter of the query;
accessing, from electronic storage, filter information for cubes stored in a cache, the cubes being pre-processed abstractions of data from a database system and being stored in the cache prior to receipt of the data request;
comparing the identified filter parameter of the query with a filter parameter of one or more cubes in the cache;
determining that the identified filter parameter of the query does not match a filter parameter of a cube in the cache;
in response to the determination that the identified filter parameter of the query does not match a filter parameter of a cube in the cache:
   determining that a filter parameter of a cube in the cache is less restrictive than the identified filter parameter of the query;
   in response to the determination that a filter parameter of a cube in the cache is less restrictive than the identified filter parameter of the query, selecting the cube having the less restrictive filter parameter for execution of the query; and
   in response to selection of the cube having the less restrictive filter parameter for execution of the query, generating a response to the data request by executing the query against the cube having the less restrictive filter parameter.

5. The method of claim 4 wherein receiving the data request that is associated with the query comprises receiving a query.

6. The method of claim 4 wherein receiving the data request that is associated with the query comprises receiving a report generation request that requires execution of a query to gather data required to generate the report.

7. A computer-implemented method comprising:
receiving a data request that is associated with a query;
identifying one or more metrics needed for satisfaction of the query;
accessing, from electronic storage, metric information for cubes stored in the cache, the cubes being pre-processed abstractions of data from a database system and being stored in the cache prior to receipt of the data request;
comparing the identified one or more metrics needed for satisfaction of the query with one or more metrics included in one or more cubes in the cache;
determining that the identified one or more metrics needed for satisfaction of the query are not found in one or more cubes in the cache;
in response to the determination that the identified one or more metrics needed for satisfaction of the query are not found in one or more cubes in the cache:
   determining that the identified one or more metrics needed for satisfaction of the query are derivable from metrics included in one or more cubes in the cache;
   in response to the determination that the identified one or more metrics needed for satisfaction of the query are derivable from metrics included in one or more cubes in the cache, selecting the one or more cubes in the cache from which the identified one or more metrics needed for satisfaction of the query are derivable; and
   in response to selection of the one or more cubes in the cache from which the identified one or more metrics needed for satisfaction of the query are derivable, generating a response to the data request by executing the query against the one or more cubes selected.

8. The method of claim 7 wherein receiving the data request that is associated with the query comprises receiving a query.

9. The method of claim 7 wherein receiving the data request that is associated with the query comprises receiving a report generation request that requires execution of a query to gather data required to generate the report.

10. An electronic system comprising:
at least one electronic data storage device; and
at least one processor configured to perform operations comprising:
   receiving a data request that is associated with a query;
   identifying one or more attributes of data needed for satisfaction of the query;
   accessing, from electronic storage, attribute information for cubes stored in a cache, the cubes being pre-processed abstractions of data from a database system and being stored in the cache prior to receipt of the data request;
   comparing the identified one or more attributes of data needed for satisfaction of the query with attributes of one or more single cubes in the cache;
   determining that attributes of a single cube are not sufficient for satisfaction of the query;
   in response to the determination that attributes of a single cube are not sufficient for satisfaction of the query:
      comparing the identified one or more attributes of data needed for satisfaction of the query with an aggregation of attributes of multiple cubes in the cache;
      determining that attributes of two or more aggregated cubes are sufficient for satisfaction of the query;
      in response to the determination that attributes of two or more aggregated cubes are sufficient for satisfaction of the query, selecting the two or more aggregated cubes having sufficient attributes for execution of the query; and
      in response to selection of the two or more aggregated cubes having sufficient attributes for execution of the query, generating a response to the data request by executing the query against the two or more aggregated cubes in the cache.

11. The system of claim 10 wherein receiving the data request that is associated with the query comprises receiving a query.

12. The system of claim 10 wherein receiving the data request that is associated with the query comprises receiving a report generation request that requires execution of a query to gather data required to generate the report.

13. An electronic system comprising:
at least one electronic data storage device; and
at least one processor configured to perform operations comprising:
   receiving a data request that is associated with a query;
   identifying a filter parameter of the query;
   accessing, from electronic storage, filter information for cubes stored in a cache, the cubes being pre-processed abstractions of data from a database system and being stored in the cache prior to receipt of the data request;
   comparing the identified filter parameter of the query with a filter parameter of one or more cubes in the cache;
   determining that the identified filter parameter of the query does not match a filter parameter of a cube in the cache;

in response to the determination that the identified filter parameter of the query does not match a filter parameter of a cube in the cache:
  determining that a filter parameter of a cube in the cache is less restrictive than the identified filter parameter of the query;
  in response to the determination that a filter parameter of a cube in the cache is less restrictive than the identified filter parameter of the query, selecting the cube having the less restrictive filter parameter for execution of the query; and
  in response to selection of the cube having the less restrictive filter parameter for execution of the query, generating a response to the data request by executing the query against the cube having the less restrictive filter parameter.

14. The system of claim 13 wherein receiving the data request that is associated with the query comprises receiving a query.

15. The system of claim 13 wherein receiving the data request that is associated with the query comprises receiving a report generation request that requires execution of a query to gather data required to generate the report.

16. An electronic system comprising:
at least one electronic data storage device; and
at least one processor configured to perform operations comprising:
  receiving a data request that is associated with a query;
  identifying one or more metrics needed for satisfaction of the query;
  accessing, from electronic storage, metric information for cubes stored in the cache, the cubes being pre-processed abstractions of data from a database system and being stored in the cache prior to receipt of the data request;
  comparing the identified one or more metrics needed for satisfaction of the query with one or more metrics included in one or more cubes in the cache;
  determining that the identified one or more metrics needed for satisfaction of the query are not found in one or more cubes in the cache;
  in response to the determination that the identified one or more metrics needed for satisfaction of the query are not found in one or more cubes in the cache:
    determining that the identified one or more metrics needed for satisfaction of the query are derivable from metrics included in one or more cubes in the cache;
    in response to the determination that the identified one or more metrics needed for satisfaction of the query are derivable from metrics included in one or more cubes in the cache, selecting the one or more cubes in the cache from which the identified one or more metrics needed for satisfaction of the query are derivable; and
    in response to selection of the one or more cubes in the cache from which the identified one or more metrics needed for satisfaction of the query are derivable, generating a response to the data request by executing the query against the one or more cubes selected.

17. The system of claim 16 wherein receiving the data request that is associated with the query comprises receiving a query.

18. The system of claim 16 wherein receiving the data request that is associated with the query comprises receiving a report generation request that requires execution of a query to gather data required to generate the report.

19. At least one computer-readable storage medium encoded with executable instructions that, when executed by at least one processor, cause the at least one processor to perform operations comprising:
  receiving a data request that is associated with a query;
  identifying one or more attributes of data needed for satisfaction of the query;
  accessing, from electronic storage, attribute information for cubes stored in a cache, the cubes being pre-processed abstractions of data from a database system and being stored in the cache prior to receipt of the data request;
  comparing the identified one or more attributes of data needed for satisfaction of the query with attributes of one or more single cubes in the cache;
  determining that attributes of a single cube are not sufficient for satisfaction of the query;
  in response to the determination that attributes of a single cube are not sufficient for satisfaction of the query:
    comparing the identified one or more attributes of data needed for satisfaction of the query with an aggregation of attributes of multiple cubes in the cache;
    determining that attributes of two or more aggregated cubes are sufficient for satisfaction of the query;
    in response to the determination that attributes of two or more aggregated cubes are sufficient for satisfaction of the query, selecting the two or more aggregated cubes having sufficient attributes for execution of the query; and
    in response to selection of the two or more aggregated cubes having sufficient attributes for execution of the query, generating a response to the data request by executing the query against the two or more aggregated cubes in the cache.

20. At least one computer-readable storage medium encoded with executable instructions that, when executed by at least one processor, cause the at least one processor to perform operations comprising:
  receiving a data request that is associated with a query;
  identifying a filter parameter of the query;
  accessing, from electronic storage, filter information for cubes stored in a cache, the cubes being pre-processed abstractions of data from a database system and being stored in the cache prior to receipt of the data request;
  comparing the identified filter parameter of the query with a filter parameter of one or more cubes in the cache;
  determining that the identified filter parameter of the query does not match a filter parameter of a cube in the cache;
  in response to the determination that the identified filter parameter of the query does not match a filter parameter of a cube in the cache:
    determining that a filter parameter of a cube in the cache is less restrictive than the identified filter parameter of the query;
    in response to the determination that a filter parameter of a cube in the cache is less restrictive than the identified filter parameter of the query, selecting the cube having the less restrictive filter parameter for execution of the query; and
    in response to selection of the cube having the less restrictive filter parameter for execution of the query, generating a response to the data request by executing the query against the cube having the less restrictive filter parameter.

21. At least one computer-readable storage medium encoded with executable instructions that, when executed by at least one processor, cause the at least one processor to perform operations comprising:

receiving a data request that is associated with a query;

identifying one or more metrics needed for satisfaction of the query;

accessing, from electronic storage, metric information for cubes stored in the cache, the cubes being pre-processed abstractions of data from a database system and being stored in the cache prior to receipt of the data request;

comparing the identified one or more metrics needed for satisfaction of the query with one or more metrics included in one or more cubes in the cache;

determining that the identified one or more metrics needed for satisfaction of the query are not found in one or more cubes in the cache;

in response to the determination that the identified one or more metrics needed for satisfaction of the query are not found in one or more cubes in the cache:

determining that the identified one or more metrics needed for satisfaction of the query are derivable from metrics included in one or more cubes in the cache;

in response to the determination that the identified one or more metrics needed for satisfaction of the query are derivable from metrics included in one or more cubes in the cache, selecting the one or more cubes in the cache from which the identified one or more metrics needed for satisfaction of the query are derivable; and in response to selection of the one or more cubes in the cache from which the identified one or more metrics needed for satisfaction of the query are derivable, generating a response to the data request by executing the query against the one or more cubes selected.

* * * * *